United States Patent [19]

van Hoff et al.

[11] Patent Number: 5,761,421
[45] Date of Patent: Jun. 2, 1998

[54] SYSTEM AND METHOD FOR SECURE PEER-TO-PEER COMMUNICATION BETWEEN DOWNLOADED PROGRAMS

[75] Inventors: Arthur A. van Hoff, Mountain View; Sami Shaio, Menlo Park; Graham Hamilton, Palo Alto; Marianne Mueller, Woodside, all of Calif.

[73] Assignee: Sun Microsystems, Inc., Palo Alto, Calif.

[21] Appl. No.: 622,462

[22] Filed: Mar. 25, 1996

[51] Int. Cl.[6] .............................. G06F 9/44; G06F 15/16
[52] U.S. Cl. .................. 395/200.53; 395/200.58; 364/DIG. 1; 364/DIG. 2; 340/825.5
[58] Field of Search .................. 395/200.15, 831, 395/200.16, 200.09, 200.03, 187.01, 182.13, 800.29, 730, 200.33, 200.52; 380/25; 370/466, 402, 338; 364/DIG. 1, DIG. 2; 340/825.5

[56] References Cited

U.S. PATENT DOCUMENTS

| 5,204,961 | 4/1993 | Barlow ............................... 395/187.01 |
| 5,235,642 | 8/1993 | Wobber et al. ......................... 380/25 |
| 5,323,392 | 6/1994 | Ishii et al. ............................... 370/466 |
| 5,347,632 | 9/1994 | Filepp et al. ...................... 395/200.09 |
| 5,434,913 | 7/1995 | Tung et al. ............................. 379/202 |
| 5,561,797 | 10/1996 | Gilles et al. ......................... 395/200.03 |
| 5,630,066 | 5/1997 | Gosling ............................... 395/200.09 |

OTHER PUBLICATIONS

Ken Thompson, "Regular Expression Search Algorithm," *Communications of the ACM*, Jun. 1968, vol. 11, No. 6, pp. 419–422.

Kin–Man Chung and Herbert Yuen, "A 'Tiny' Pascal Compiler; Part 1: The P–Code Interpreter," *BYTE Publications, Inc.*, Sep. 1978.

Kin–Man Chung and Herbert Yuen, "A 'Tiny' Pascal Compiler; Part 2: The P–Compiler," *BYTE Publications, Inc.*, Oct. 1978.

Gene McDaniel, "An Analysis of a Mesa Instruction Set," *Association for Computing Machinery*, May 1982.

Kenneth A. Pier, "A Retrospective on the Dorado, A High–Performance Personal Computer," *IEEE Computer Society, 10th Annual Intl. Symposium on Computer Architecture*, 1983, pp. 252–269.

James G. Mitchell, et al., "Mesa Language Manual," *Xerox Corporation, Palo Alto Research Center*.

*Primary Examiner*—Daniel H. Pan
*Attorney, Agent, or Firm*—Gary S. Williams; Flehr Hohbach Test Albritton & Herbert LLP

[57] ABSTRACT

A system and method for establishing a peer-to-peer communication connection between computer programs from the same security domain, but executing in first and second computers, is disclosed. A first computer program, while executing in the first computer, sends a communication a message to the second computer, requesting a peer-to-peer communication connection. Upon receiving the message at said second computer, the second computer determines whether a second computer program meeting predefined criteria for establishing a peer-to-peer communication connection is executing in the second computer. If so, the second computer sends to the first computer a reply message accepting the request. After receipt of the reply message by the first computer, the requested peer-to-peer communication connection between the first and second computer programs is established. In a preferred embodiment, the predefined criteria for establishing a peer-to-peer communication connection is that the first and second computer programs be from the same server computer.

9 Claims, 3 Drawing Sheets

1

SYSTEM AND METHOD FOR SECURE PEER-TO-PEER COMMUNICATION BETWEEN DOWNLOADED PROGRAMS

The present invention relates generally to establishing secure communications between two software entities, operating in separate computers or virtual machines, where the two software entities have a peer-to-peer relationship, and particularly to a system and method for establishing a communication channel between copies of an application program.

BACKGROUND OF THE INVENTION

The term "applets" is herein defined to mean computer programs and computer program fragments.

Due to security constraints, computer programs in object-oriented computer systems are usually constrained to communicate in a client-server manner. For instance, in Sun Microsystems' Java virtual machine, when a method running in client computer requests an applet from a server computer, the browser program in the client computer marks the received applet to indicate the server from which the applet was received, and thereafter limits the information accessible to the applet to documents and other applets from the same server computer. Further, the downloaded applet is allowed by the Java virtual machine to open a communication channel to other applets on the server from which the applet was downloaded, but generally cannot open communication channels to applets in other computers.

It is the goal of the present invention to allow two copies of a computer program running on two distinct computers or virtual machines to communicate securely. More generally, it is the goal of the present invention to allow two programs obtained from the same security domain and executing on two different client computers to communicate securely. Typically, the two programs obtained from the same security domain will be two programs downloaded from the same server computer onto two different client computers. In many cases the two programs will be two copies of the same program downloaded onto two different client computers.

The basis for allowing such peer-to-peer connections is that sufficient security is provided when the communicating applets are both from the same server computer, because each applet would already have been allowed to open a communication channel to the server computer and therefore could have communicated indirectly with applets downloaded from the same server computer onto other client computers.

SUMMARY OF THE INVENTION

In summary, the present invention is a system and method for establishing a peer-to-peer communication connection between computer programs from the same security domain, but executing in first and second computers. A first computer program, while executing in the first computer, sends a communication a message to the second computer, requesting a peer-to-peer communication connection. Upon receiving the message at said second computer, the second computer determines whether a second computer program meeting predefined criteria for establishing a peer-to-peer communication connection is executing in the second computer. If so, the second computer sends to the first computer a reply message accepting the request. After receipt of the reply message by the first computer, the requested peer-to-peer communication connection between the first and second computer programs is established.

In a preferred embodiment, the predefined criteria for establishing a peer-to-peer communication connection is that the first and second computer programs be from the same server computer.

In a preferred embodiment, the reply message includes information that reliably indicates to the first computer that the second computer is executing a computer program meeting the predefined criteria for establishing a peer-to-peer communication connection.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
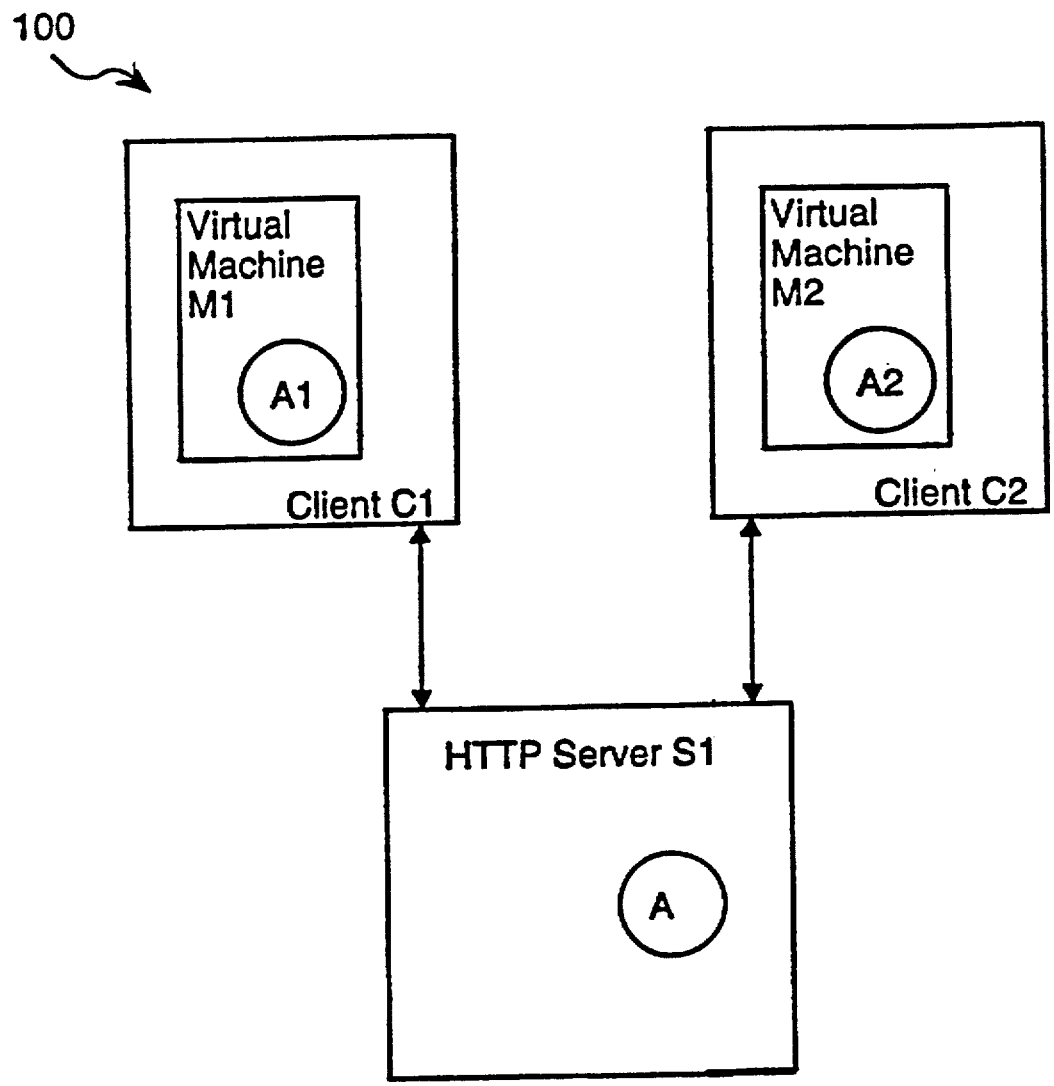
FIG. 1 is a block diagram of a distributed computer system in which a preferred embodiment of the present invention is implemented.

Referring to FIG. 1, there is shown a distributed computer system 100 that includes two client computers C1 and C2 and server computer S1. Each client computer includes a virtual machine, M1, M2, that provides the operating environment for executing a browser program such as HotJava (a product distributed by Sun Microsystems, Inc.) (not shown in FIG. 1) and for executing Java bytecode programs such as A1, A2 loaded through the use of the browser program. In the context of the present invention, the browser programs associated with virtual machines M1, M2 have been used to download program A from server S1, creating identical programs A1 and A2 and virtual machines M1 and M2, respectively.

Using standard client-server communication channels, it would be possible for applet A1 to communicate with applet A2 via the server S1 by setting up object class methods for use by the clients and server to create and maintain such communication channels. In other words, applet A1 could communicate securely with server S1 and then server S1 could communicate securely with applet A2, thereby creating a two stage connection between applets A1 and A2.

Typically, this would be implemented using communication "sockets" in the client and server computers that would be set aside specifically for the transmission of such messages. The communication sockets would be defined by the applets and server software so that messages received from an applet executing on a client computer would be received at the server at a communication socket that is monitored by a corresponding program. The socket monitoring program in the server would then determine for each received message which other client computer to forward the message to, and what communication socket to use for that communication. While addition software logic would be required to handle all the possible communication modes and failure modes of an arrangement, those details are well within the skill of persons skilled in the art of designing such software and furthermore are not needed to understand the present invention.

In the preferred embodiment, the applets and other programs being executed are primarily Java bytecode programs.

The Java bytecode language is a "machine platform independent" programming language marketed by Sun Microsystems, Inc. Java bytecode programs are executed in conjunction with a bytecode program interpreter that forms a virtual machine. Java bytecode programs are designed so that they can be executed on any computer, regardless of the operating system and computer hardware platform of the computer, so long as a Java bytecode program interpreter is present on the computer.

Figure 2:
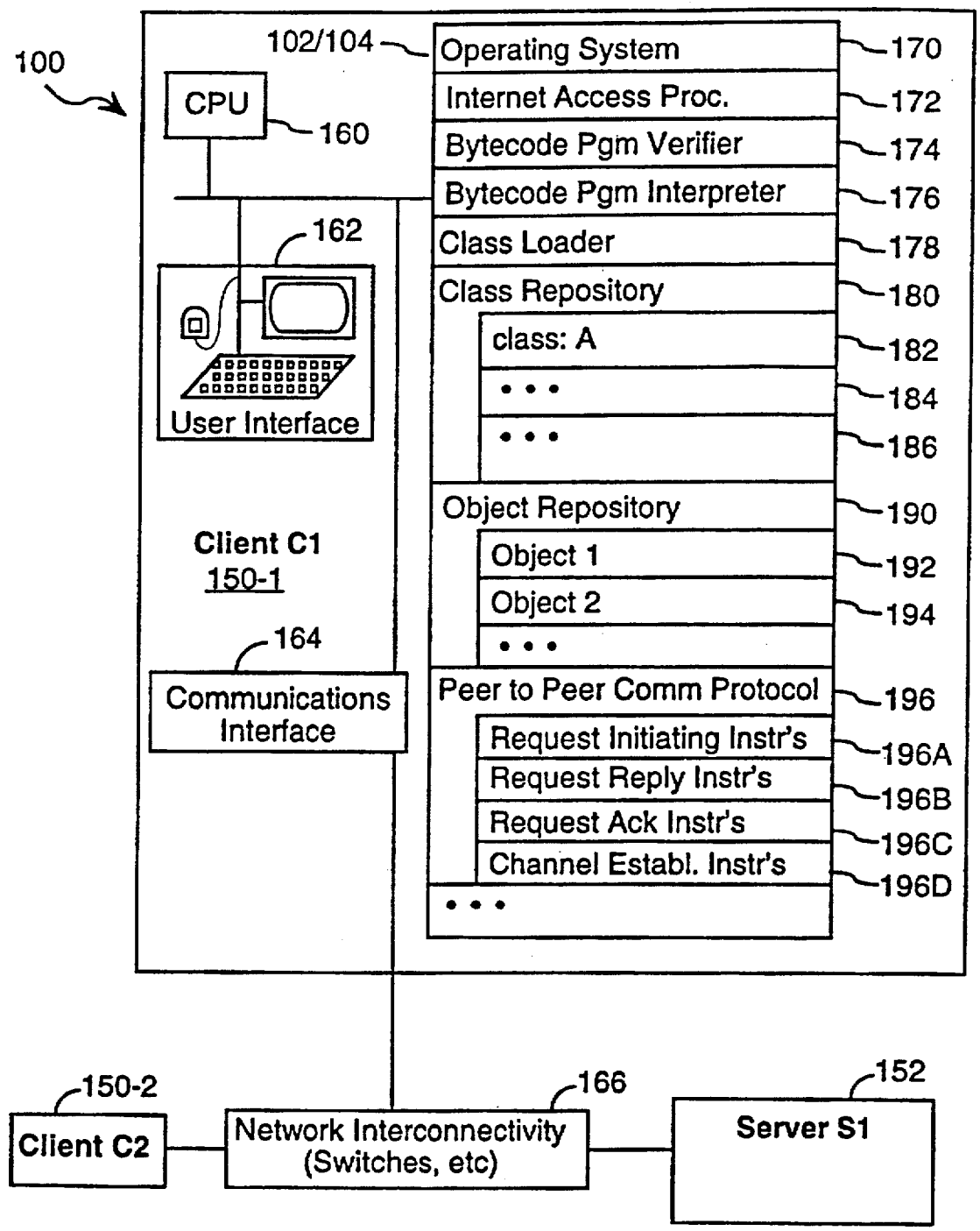
FIG. 2 is a block diagram of a client computer in a distributed computer system in accordance with a preferred embodiment of the present invention.

Referring to FIG. 2, in a preferred embodiment the computer system 100 incorporating a preferred embodiment of the present invention will typically include a plurality of client computers 150 and one or more server computers 152 in a system of networked computers. Each client computer 150 includes a central processing unit (CPU) 160, a user interface 162, and a communications interface 164 for communication with other computers via communications network 166.

Memory 102/104, which includes both main memory 102 and persistent storage 104, stores:

an operating system 170;

an Internet communications manager program 172, such as the HotJava browser program;

a Java bytecode program verifier 174 for verifying whether or not a specified program satisfies certain predefined integrity criteria;

a Java bytecode program interpreter 176 for executing application programs;

a class loader 178, which loads object classes into a user's address space and utilizes the bytecode program verifier to verify the integrity of the methods associated with each loaded object class;

at least one class repository 180, for locally storing object classes 182, 184, 186 in use and/or available for use by user's of the computer 102;

at least one object repository 190 for storing objects 192, 194, which are instances of objects of the object classes stored in the object repository 182;

a peer-to-peer communication protocol procedure 196. This procedure 196 includes: request initiating instructions 196A for sending a request message from a first computer to a second computer to request establishment of a peer-to-peer communication channel; request reply instructions 196B for responding to such a request by determining if predefined criteria for establishing a peer-to-peer communication channel are met and for sending a corresponding reply message; reply acknowledgment instructions 196C for acknowledging such a reply message; and channel establishment instructions 196D for establishing a peer-to-peer communication channel when the reply message indicates that the predefined criteria have been met.

Figure 3:
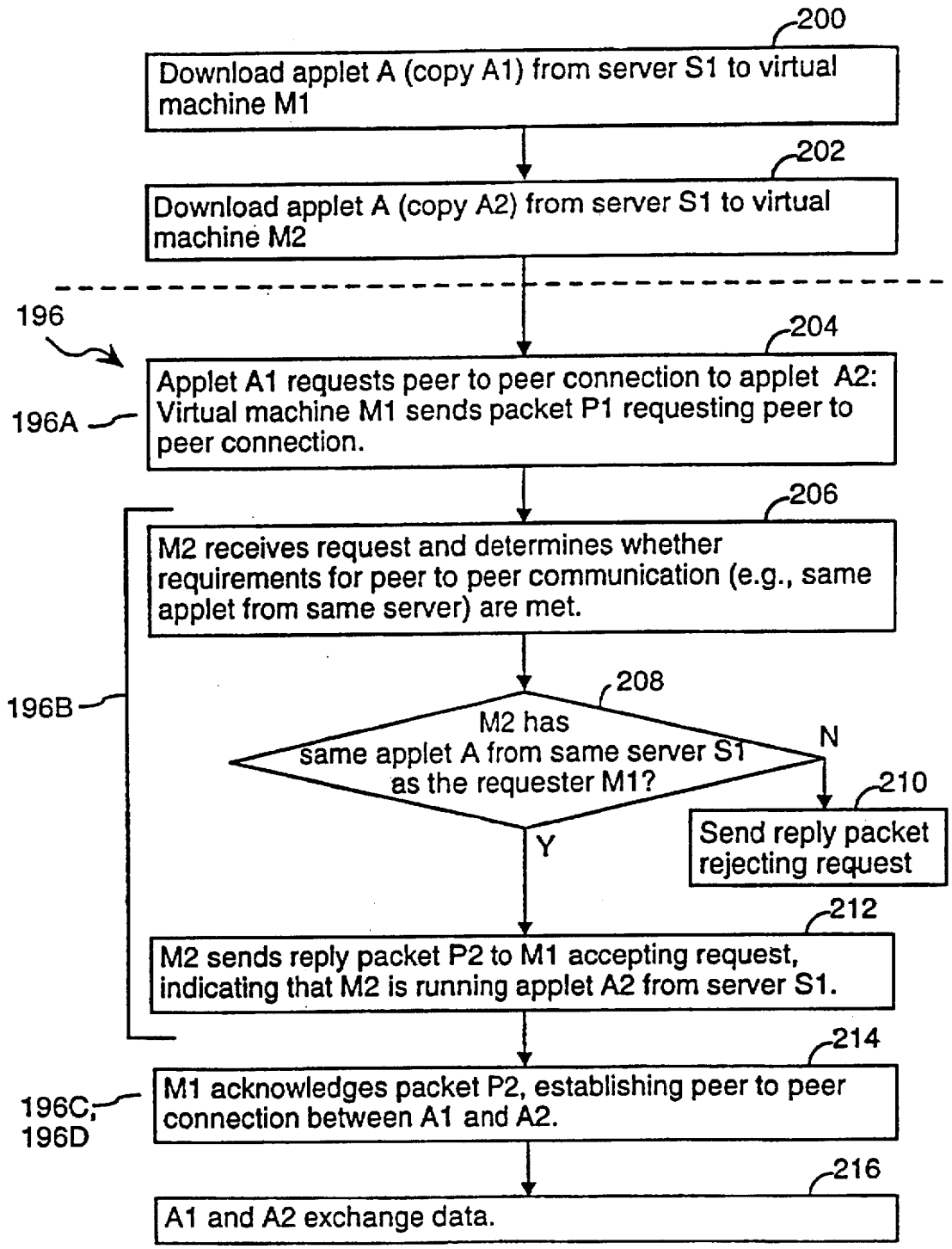
FIG. 3 is a flow chart of the methodology of a preferred embodiment of the present invention.

Referring to FIG. 3, prior to execution of the peer-to-peer communication protocol 196, at least two virtual machines M1 and M2 will have downloaded copies of the same application program A (copies A1 and A2) from a server computer S1 (steps 200, 202). Alternately, the two virtual machines M1 and M2 will have downloaded copies of two different application programs from the same server computer S1. For the purposes of explaining the invention, we will assume that the two downloaded programs are the same, but in some embodiments of the present invention different programs from the same server will establish a peer-to-peer communication channel.

In FIG. 3 we will assume that applet A1 in virtual machine M1 initiates the process of establishing a communication connection to applet A2 in virtual machine M2 by invoking a method that causes virtual machine M1 to send a message packet P1 to virtual machine M2 requesting a peer-to-peer connection for an application identified as application A (step 204).

Virtual machine M2 receives the packet P1 and a control program that controls the operation of virtual machine M2 (e.g., the HotJava browser program executing in virtual machine M2) determines whether or not it meets predefined criteria for establishing a peer-to-peer communication connection (step 206). In a preferred embodiment the predefined criteria are that the receiving virtual machine has an applet whose server source matches the server source of the initiating applet. In addition, in the preferred embodiment there must be an applet or program executing in the receiving virtual machine that is set to receive messages on the socket or communication channel used by the initiating applet.

If virtual machine M2 does not meet the predefined peer-to-peer connection criteria, then it sends a reply packet to virtual machine M1 rejecting the request (step 210), or alternately simply ignores the request message. Otherwise, virtual machine M2 sends a reply packet P2 to virtual machine M1 accepting the request, and indicating that virtual machine M2 is running applet A2 rom server S1 (step 212).

In some applications where additional security is required, or where peer-to-peer communications are to be allowed only between identical copies of the same applets, the reply packet may include evidence that packet P2 was actually sent by virtual machine M2 and that M2 really has a copy of applet A2. For instance, in this alternate embodiment the reply packet P2 includes a copy of at least a predefined portion of a unique number associated with the applet A2.

Additional security provisions, such as the use of digital signatures or the like, may be added by underlying protocol layers of the communication software used by the virtual machines, for instance so that M1 can verify that the reply packet really was sent by M2. More generally, each of the virtual machines M1 and M2, operating on corresponding client computers, will use whatever communication security measures are associated with the security domain of which they and the server S1 are members and that would normally be used for communications between those virtual machines and the server S1. However, such additional security measures are an optional part of the operating environment in which the invention may be used.

Upon receipt and processing of the reply packet P2, virtual machine M1 sends an acknowledgment message back to virtual machine M2, establishing a peer-to-peer connection between applets A1 and A2 (step 214). Thereafter, the two applets exchange messages and data (step 216) in accordance with the common security restrictions shared by the two applets.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of establishing a peer-to-peer communication connection between computer programs executing in first and second computers, the steps of the method comprising:

A) a first computer program, while executing in the first computer, sending a communication a message to the second computer, said message requesting a peer-to-peer communication connection;

B) receiving said message at said second computer, and determining whether a second computer program meeting predefined criteria for establishing a peer-to-peer communication connection is executing in said second computer;

C) when step B results in a positive determination, sending from said second computer to said first computer a reply message accepting said request; and D) after receipt of said reply message by said first computer, establishing said requested peer-to-peer communication connection between said first and second computer programs;

wherein the predefined criteria for establishing a peer-to-peer communication connection is that the first and second computer programs both have been received by the respective first and second computers from a single server computer.

2. The method of claim 1, wherein said step D includes sending an acknowledgment of said reply message from said first computer to said second computer when said reply message indicates a positive disposition, wherein the peer-to-peer communication connection is established in conjunction with the sending of the acknowledgment of the reply message.

3. The method of claim 1, wherein said reply message includes information that reliably indicates to the first computer that said second computer is executing a computer program meeting said predefined criteria for establishing a peer-to-peer communication connection.

4. In a distributed computer system having first and second client computers and a server computer from which copies of computer programs are downloaded to said first and second client computers, said second client computer comprising:

a virtual machine with a communications procedure for receiving a message from a first computer program executing in the first computer, said message requesting a peer-to-peer communication connection;

said virtual machine's communication procedure including means for determining whether a second computer program meeting predefined criteria for establishing a peer-to-peer communication connection is executing in said second computer, and when said determination is positive for sending from said second computer to said first computer a reply message accepting said request; and said virtual machine's communication procedure including means for establishing said requested peer-to-peer communication connection between said first and second computer programs after transmission of said reply message to said first computer;

wherein the predefined criteria for establishing a peer-to-peer communication connection is that the first and second computer programs both have been received by the respective first and second computers from a single server computer.

5. The client computer of claim 4, wherein said means for establishing said requested peer-to-peer communication connection is enabled upon receiving from said first computer an acknowledgment of said reply message.

6. The client computer of claim 4, wherein said reply message includes information that reliably indicates to the first computer that said second computer is executing a computer program meeting said predefined criteria for establishing a peer-to-peer communication connection.

7. In a distributed computer system having first and second client computers and a server computer from which copies of computer programs are downloaded to said first and second client computers, said first client computer comprising:

a virtual machine with a communications procedure for sending a request message to the second computer from a first computer program executing in the first computer, said message requesting a peer-to-peer communication connection;

said virtual machine's communication procedure including means for receiving a reply message from the second computer, said reply message indicating a positive disposition when a second computer program meeting predefined criteria for establishing a peer-to-peer communication connection is executing in said second computer; and said virtual machine's communication procedure including means for establishing said requested peer-to-peer communication connection between said first and second computer programs after receipt of said reply message by said first computer;

wherein the predefined criteria for establishing a peer-to-peer communication connection is that the first and second computer programs both have been received by the respective first and second computers from a single server computer.

8. The client computer of claim 7, wherein said virtual machine's communication procedure including means for sending an acknowledgment of said reply message when said reply message indicates a positive disposition;

said means for establishing said requested peer-to-peer communication connection is enabled in conjunction with the sending of said acknowledgment of said reply message.

9. The client computer of claim 7, wherein said reply message includes information that reliably indicates to the first computer that said second computer is executing a computer program meeting said predefined criteria for establishing a peer-to-peer communication connection.

* * * * *